(12) United States Patent
Shu et al.

(10) Patent No.: US 7,148,637 B2
(45) Date of Patent: Dec. 12, 2006

(54) PORTABLE COMPOUND BATTERY UNIT MANAGEMENT SYSTEM

(75) Inventors: Ying-Hao Shu, Taipei (TW); Bin-Yen Ma, Taipei (TW)

(73) Assignee: Wiz Energy Technology, Co., Ltd., Taipei (TW)

( * ) Notice: Subject to any disclaimer, the term of this patent is extended or adjusted under 35 U.S.C. 154(b) by 0 days.

(21) Appl. No.: 11/127,125

(22) Filed: May 12, 2005

(65) Prior Publication Data

US 2006/0255755 A1 Nov. 16, 2006

(51) Int. Cl.
*H02P 1/00* (2006.01)
(52) U.S. Cl. ......................................... 318/139; 307/18
(58) Field of Classification Search ................ 318/139; 320/134, 132; 429/90; 307/18; 388/80, 388/908
See application file for complete search history.

(56) References Cited

U.S. PATENT DOCUMENTS

2004/0222771 A1* 11/2004 Iwata et al. ................. 320/134
2005/0048359 A1* 3/2005 Yamada et al. ............... 429/90

* cited by examiner

*Primary Examiner*—Karen Masih
(74) *Attorney, Agent, or Firm*—Rosenberg, Klein & Lee

(57) ABSTRACT

A portable compound battery unit management system comprises a portable high capacity battery unit, a main power battery unit, and a DC converter. The portable high capacity battery unit has a built-in battery management means and is connected to the DC converter. The main power battery unit supplies power to a motor which in turn drives the vehicle, and contains another battery management means or a device for limiting maximum output current, or provides the DC converter and a motor controller installed behind with battery information required to operate the vehicle. The DC converter transfers the electrical energy of the portable high capacity battery unit to the main power battery unit, or converts output power of the portable high capacity battery unit to a necessary power required to operate the motor controller, wherein it has boost up or buck down function of voltage to match the voltage difference between the two battery units. With this scheme, the effectively combined portable high capacity battery unit and main power battery unit are very convenient to supply mechanical power for driving the motor bicycle to travel desired distance with a low operation and maintenance cost.

6 Claims, 3 Drawing Sheets

PORTABLE COMPOUND BATTERY UNIT MANAGEMENT SYSTEM

BACKROUND OF THE INVENTION

1. Field of the Invention

The present invention relates to a portable compound battery unit management system, and in particular, to a portable compound battery unit management system which can be loaded on any motor drive vehicle so as to supply and supplement sufficient mechanical power for the vehicle to travel desired distance by well co-operative function between a portable high capacity battery unit and a main power supply battery unit contained in the system with a reliably low operation cost.

2. Description of the Prior Art

In recent years, stimulated by the environment consciousness the less pollutant, medium or short distance private transportation tool becomes indispensable for the future urban development. Meanwhile, the progress of novel battery technology, electrical power control technique and its devices provides the lightweight motor-driven vehicle with a hope of brilliant future.

In the prior battery technology, the study is focused on how to improve the output performance of the high capacity battery unit and the high power supply battery unit to obtain an ideal compound battery system (see Taiwan Pat. Publication No. 494071, Jul. 11, 2002) or, on the other hand, by utilizing a possibly essential future power source, a fuel cell, together with a high power battery unit to ensure the fuel cell to serve for a long duration of system operation in better efficiency. With this scheme, the necessary secondary battery also provides the required control power for the running of the fuel cell (See Taiwan Pat. Publication No. 559602, Nov. 1, 2003). In the above-mentioned cases, the real user's needs and the questionable problems are seldom encountered with the promoting market of motor-driven vehicles. One of the problems is that most of districts where urgently demanding for using the motor-driven vehicles are the downtowns so congested in population and buildings resulting in difficult to find suitable place for allowing exhausted battery unit to make long time recharging. In most densely populated cites, the average traveling distance for a person per day is 20 to 30 km. Accordingly, a battery unit allowable for the vehicle to go more than 60 km per day is an excessively luxurious facility when considering its recharge and maintenance. Moreover, the trend of design of a conventional battery system has too indulged in exhibiting electronic control technology and control system for compound output. Consequently, it only obtains a high intelligent performance of battery protection and mechanical power, but instead, a high cost incurred by losing efficiency in numerous times of energy conversion and electronic control, which means in such a complicated system has been neglected that leads to an obstruction to promoting a market for motor drive vehicles.

The inventor has dedicated great efforts for years to studying and improving these shortcomings inherent to the prior art and come up finally with a novel portable compound battery unit management system as provided in this invention to eliminated the shortcomings mentioned above.

SUMMERY OF THE INVENTION

In keeping pace with the progress of electronic technology, the aims how to prolong the battery lifespan and smoothly output its electrical power have been overcome. However, it is remained as the most important unsolved problem how to supplement the electrical power for a motor-driven vehicle to fit for the user's habit. In recent years, the study puts its basis on how to improve the battery system, and actually a lot of novel and tangible ideas have been suggested, but most of the suggestions are limited in the scope of how to realize the longest traveling distance within an allowable weight and price. But it remains still unsolved as how to obtain energy supply easily from an existing energy supply network so as to lowering the overall electronic control cost in a battery unit effectively.

The kernel of the portable compound battery unit management system according to the present invention lies in that how to provide a simple battery system that can fulfill the need for a vehicle to travel more than 60 km per day which being longer than 30 km per day for most of the fuel drive vehicles by providing means for rapid recharging. To achieve this object, the present invention provides a main power battery unit entrained on the motor drive vehicle, and a DC converter (from now on, call it a converter) capable of predicating the time to start by a simple logic judgment. With this scheme in the battery unit along with an extra electrical power supply means that the expectation of most of the users to perform possible maximum traveling distance per day by supplementing electrical energy in a handy way can be fulfilled.

THE PREFERRED EMBODIMENT OF THE PRESENT INVENTION

Figure 1:
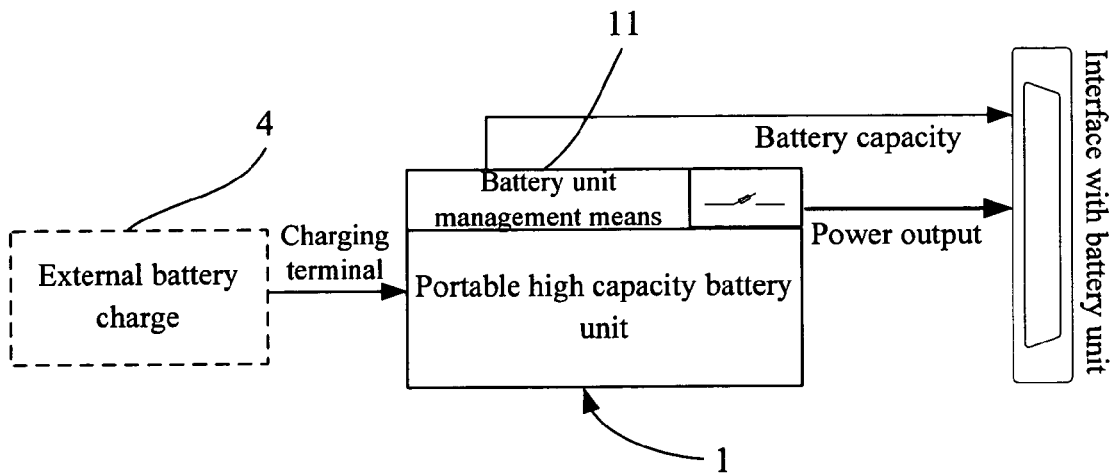
FIG. 1 is a schematic view of the present invention.

Referring to FIG. 1, in this schematic view of the present invention, the portable compound battery unit management system contains a portable high capacity battery unit 1 essentially for supplying a motor drive vehicle with daily requirement of energy consumption for traveling predetermined distance in high energy-weight ratio and reasonable weight and volume. The applicable batteries include high power Lithium ion and Lithium polymer batteries. In the future, and exchange type fuel cell used in the notebook computer might be one of the selection owing to its merits in compactness and low cost. The portable high power battery unit 1, which is not limited to one unit only in application, can be recharged with an externally adapted battery charger 4. For this reason, the battery unit 1 must be accompanied by a built in battery unit management means 11 with respect to the types of installed battery unit so as to ensure its stability and security in case it is separated from the vehicle. Such an independently operable case battery unit management means 11 can liberate difficulty of overall system management and lower the overall cost for electronic control and improve the stability of the overall system. Besides, the battery unit management means 11 is functional for low capacity indication and low capacity cut-off so as to facilitate means for controlling a DC converter installed at its rear side.

Figure 2:
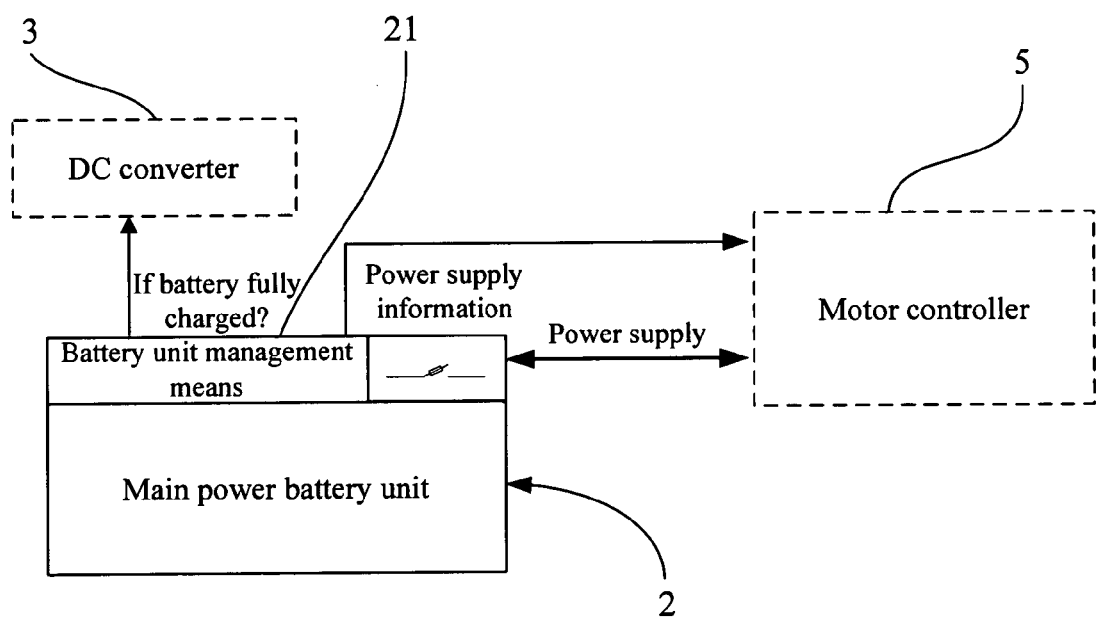
FIG. 2 is a schematic view of the main power battery unit of the present invention.

Referring to FIG. 2, a main power battery unit 2 is a high power battery unit capable of supplying electrical power to a motor controller 5 for either instantaneously or a long duration of time. The applicable batteries for this battery unit are those ordinary batteries such as Pb./CaSO4 battery, Ni-mH battery, Ni—Zn battery, Li—Mn/Li—Co Battery, and Li-Polymer battery. Being an essential power source for the motor, the component batteries used in the main power battery unit are connected in series. The battery unit 2 must contain a battery management means 21 or a device for control maximum output current so as to insure the security and stability of the battery unit 2 during operation and prolong the lifespan of the battery unit 2 as well. Moreover, the battery management means 21 serves to provide the converter 3 and the motor controller 5 installed at the rear side with necessary information for operation.

Figure 3:
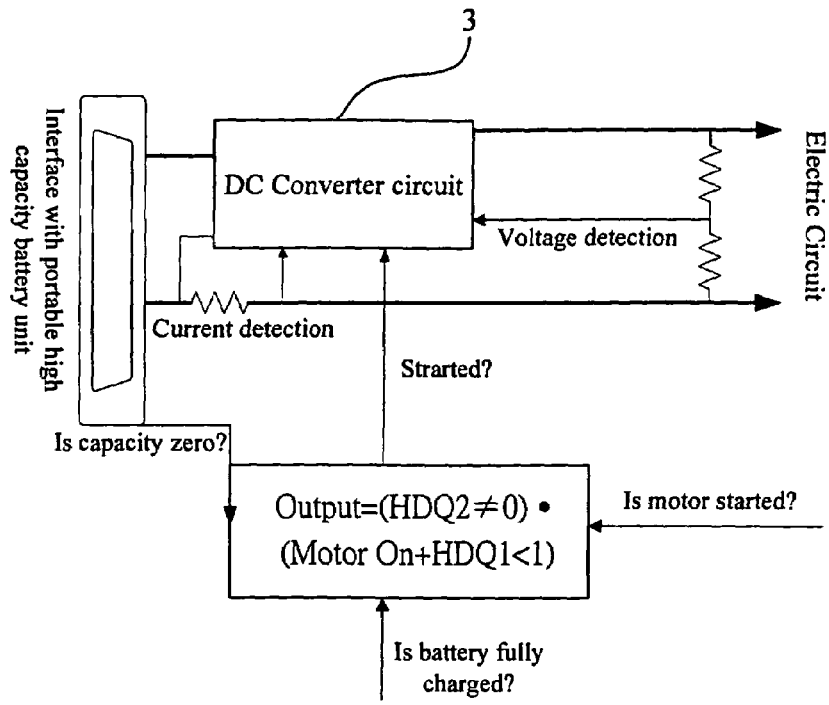
FIG. 3 is a schematic view of the DC converter of the present invention.
Figure 4:
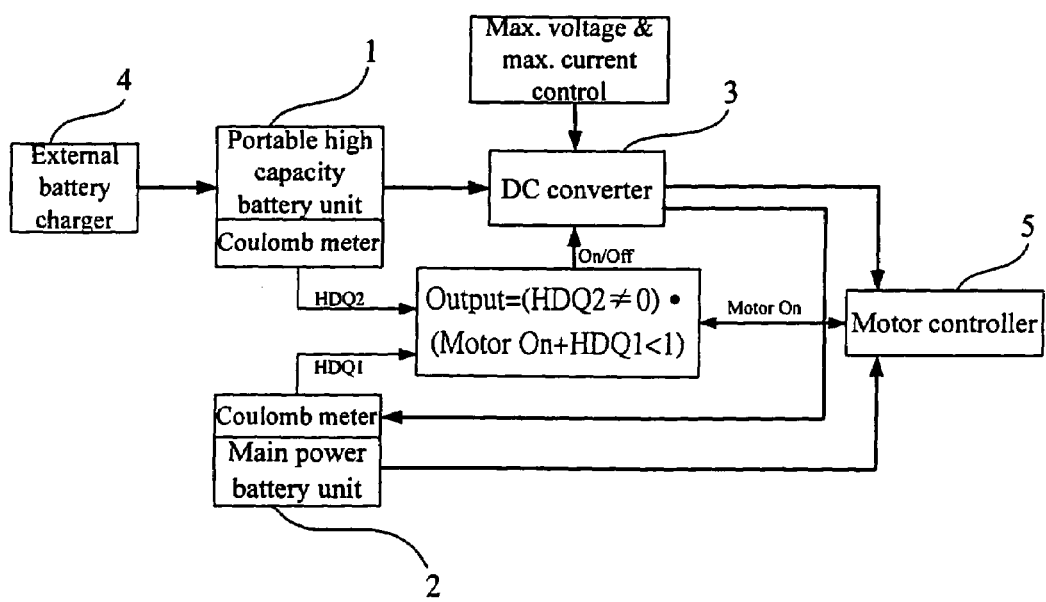
FIG. 4 is an illustrative flow chart of energy conversion control.

Referring to FIG. 3 and FIG. 4, which are respectively a schematic view of the converter and an illustrative flow chart of energy conversion control according to the present invention. As shown in FIG. 3, the converter 3 is a simple battery charger usable to transfer the electrical energy from the portable high capacity battery unit 1 to the main power battery unit 2 either by boosting up or bucking down the voltage depending on the difference of rated voltages between the portable high capacity battery unit 1 and the main power battery unit 2. The way of control is based on the formula Output=(HDQ2 $\neq$0)·(Motor On+HDQI<1) in which only three conditions are taken into account, i.e. whether the residual charge of the battery unit 1 is zero, whether the battery unit 2 is fully charged, and whether the motor controller 5 is in working state. In all, the mission of the converter 3 is transforming the electric output of the battery unit 1 to the electrical power of the battery unit 2, or transforming the electric output of the battery unit 1 to the working power of the motor controller 5. Since the conventional converter 3 is easy to achieve the object to output maximum current and maximum voltage, the demand of charging and discharging the battery units stably with high efficiency can be easily fulfilled. As the converter 3 is also a battery charger capable of limiting maximum current, it can output power to the moving vehicle so as to assist the main power battery unit 2 by sharing part of power demand for the motor controller 5 and supplement the power to the main power battery unit 2. In case the traveling distance exceeds 30 km, which being beyond the ability of the battery unit 1 to carry out, it can be recharged again with the external battery charger 4 for supplement of energy, or prepare two portable high capacity battery units 1, or recharge the entire compound battery system directly thereby completely restoring the power of the main power battery unit 2.

Figure 5:
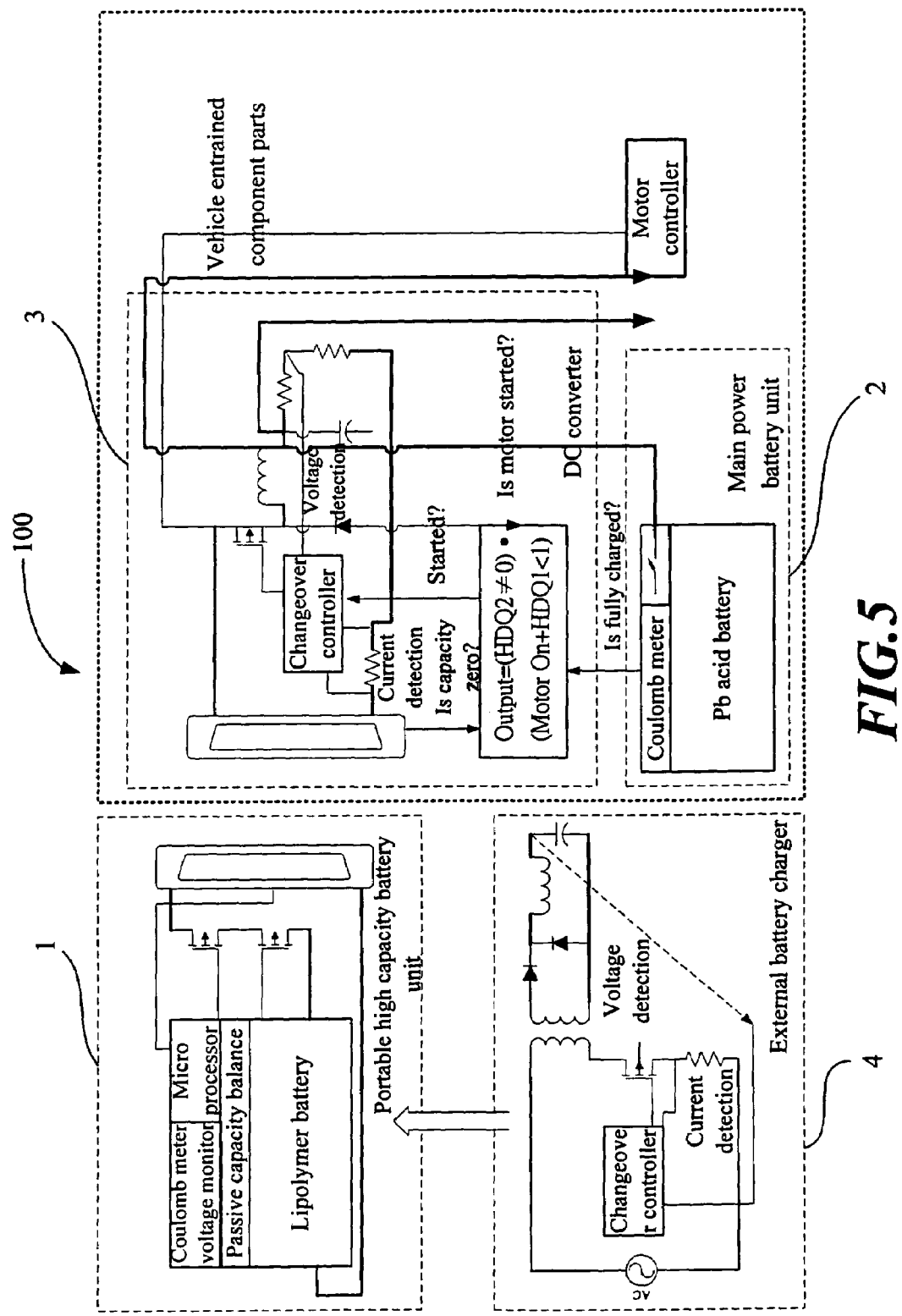
FIG. 5 is a schematic view of an embodiment of the present invention.

An embodiment of the present invention is shown in FIG. 5, the portable compound battery management system 100 is designed basically as a battery unit for a light type motor-driven bicycle. The performance data are as follows: load: 70 kgw, total weight of the vehicle: 130 kgw, maximum traveling distance: 70 km, traveling distance for fully charged portable high capacity battery unit 1: 35 km, average vehicle speed: 30 km/hr. Under this situation, a 36 v/17 Ah/20 kg Pb-acid battery unit with a charge indicator is selected relevant to serve as the main power battery unit 2. The selective portable high capacity battery unit 1 is a 12 series/10 Ah/5 kg Lithium-Polymer battery unit accompanied with functions of individual battery voltage control, passive battery capacity balancing, working temperature protection, and battery capacity indication so as to form a battery management means. The converter 3 is rated at 5 A constant current, 43.5 v buck down converter together with a control circuit to work at a predetermined condition. The portable high capacity battery unit 1 having 450 Wh total power with available power of 430 W after stepping down by the converter can provide the light type motor drive auto bicycle to travel 1.2 hr and above at a speed of 30 km/1 hr. With this performance, the user can constantly maintain the two battery units 1 and 2 at a fully charged state by means of the office or the domestic outlet as a charging source. The overall compound battery management system 100 is able to provide electric energy of 1000 Wh for the motor bicycle to run above 3 hours at 30 km/h, reaching 90 km distance. After that the portable high capacity battery unit 1 may be set in the compound battery management system 100 so as to recharge the overall battery units 1, 2 at the same time, or may select to recharge the portable high capacity battery unit 1 several times alone so as to keep its maximum continuous power output at 1.0 kW. With this scheme, the compound battery management system can satisfy the demand of the user with low operation cost by effective cooperative action between a high capacity battery unit and a high power output battery unit. This is the kernel of the present invention. The battery management means built in the portable high capacity battery unit 1 and the low cost external battery charger 4 usable for charging the Lithium battery with constant current and voltage are already sufficient for maintaining the performance of the high capacity battery unit 1. The motor controller 5 installed at the rear terminal of this system is able to work stably only if it can be fulfilled the requirement of maximum continuous input current at minimum 30V working voltage. The electronic circuit, which is the heart of the system, is but a buck down converter capable of outputting maximum voltage and current. In case the control chip of the circuit has a function to standby at low current, and a simple logic to judge whether the electric power of the two battery units is enough to operate the motor controller (does the vehicle can start?), the both battery unit management means are sure to operate the both battery units stably. If the portable compound battery unit management system of this invention is compared with the above two cited inventions and other prior arts, it has several noteworthy advantages, namely:

1. The effectively combined battery with the portable high capacity battery unit and the main power battery unit is very convenient to supply the power for driving the motor vehicle to travel desired distance with a low operation and maintenance cost.

2. The system is applicable to any type of motor-driven vehicle. The portable high capacity battery unit is light weighted so that they can be detached from the vehicle for recharge even up to high-rise buildings.

3. The portable high capacity battery unit has a high energy-weight ratio so that it can supply the vehicle a sufficient power for everyday running. A compact and inexpensive exchange type fuel cell used in a notebook computer is also applicable other than those batteries described above.

While the invention has been described in terms of what are presently considered to be the most practical and preferred embodiment, it is to be understood that the invention need not be limited to the disclosed embodiment. On the contrary, it is intended to cover various modifications and similar arrangement included within the spirit and scope of the appended claims, which are to be accorded with the broadest interpretation so as to encompass all such modifications and similar structure.

Incidentally, the present invention is a high level technical creation and by no means, simply utilizing conventional technology or knowledge known prior to the application for patent or can easily made by persons skilled in the arts prior to the application for patent, the invention has neither been published or put to public use, nor displayed in an exhibition. Therefore, we think, the present invention is entitled for patent.

What is claimed is:

1. A portable compound battery unit management system for an electrically powered vehicle, comprising:
   a DC converter coupled to a motor controller, said motor controller being coupled to a propulsion motor of the vehicle;
   a main power battery unit coupled to said DC converter for supplying power to drive said propulsion motor, said main power battery unit including a plurality of cells coupled in series and a battery management means for limiting a maximum output current of said series coupled cells, said battery management means being coupled to said DC converter and said motor controller to provide battery operational data thereto; and
   at least one interchangeable and portable high power density supplemental battery unit detachably coupled to the vehicle and having a built-in battery management means having a low capacity cut-off and being connected to said DC converter, said supplemental battery unit being selectively removed for charging independently of said main power battery unit with an external charger, said supplemental battery unit powering said propulsion motor in parallel with said main power battery unit through said DC converter for sharing the power demand thereof;
   said DC converter converting an output voltage of said supplemental battery unit to match an output voltage of said main power battery unit and selectively coupling said supplemental battery unit to said main power battery unit.

2. The battery unit management system of claim 1, wherein at least one supplemental battery unit includes a battery type selected from the group consisting of a high capacity Li ion battery, a Li Polymer battery, and an exchange type fuel cell.

3. The battery unit management system of claim 1, wherein said main power battery unit includes a battery type selected from the group consisting of a Pb/CaSO4 battery, a Ni-mH battery, a Ni—Zn battery, a Li—Mn/Li—Co battery, and a Li-Polymer battery.

4. The battery unit management system of claim 1, further comprising logic to judge whether electric energy stored in said two battery units is enough to operate said motor controller.

5. The battery unit management system of claim 1, wherein said DC converter includes control functions of checking whether a residual charge of said supplemental battery unit is zero, whether said main power battery unit is fully charged, and whether said motor controller is in a working state.

6. The battery unit management system of claim 1, further comprising a second supplemental battery unit for interchange with said supplemental battery unit coupled to said DC converter when said supplemental battery unit coupled to said DC converter has been discharged.

* * * * *